March 12, 1940. H. L. MUELLER 2,193,639
STEERING WHEEL
Filed Oct. 25, 1935
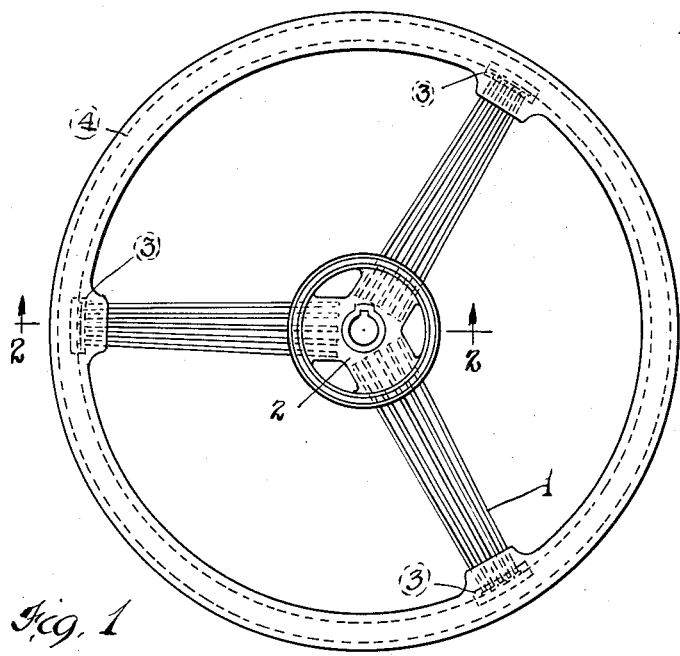
Fig. 1
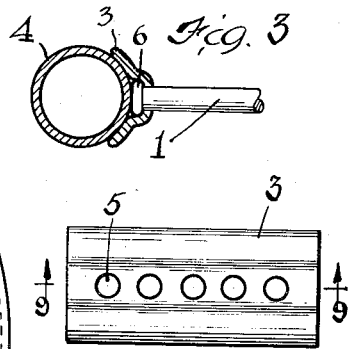
Fig. 3
Fig. 4
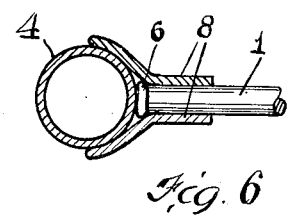
Fig. 6
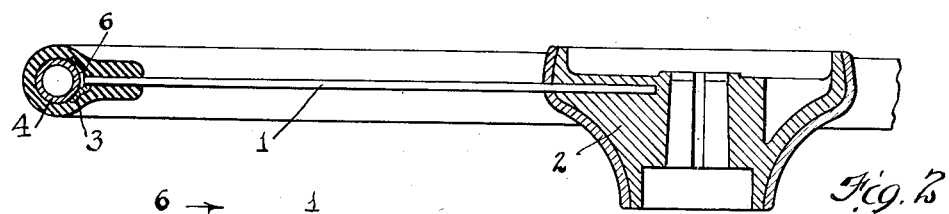
Fig. 2
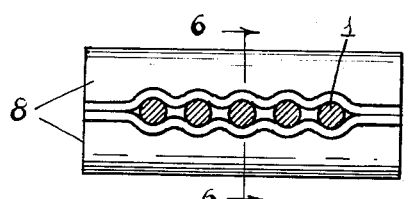
Fig. 5
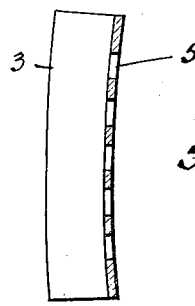
Fig. 9
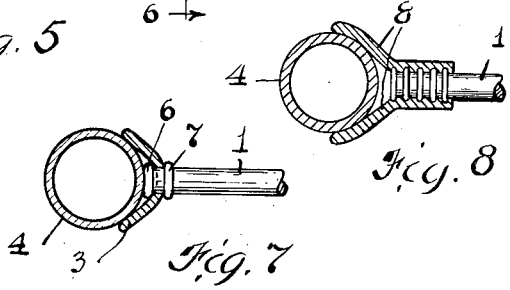
Fig. 7
Fig. 8
INVENTOR.
Homer L. Mueller
BY Fay, Oberlin & Fay
ATTORNEYS.

Patented Mar. 12, 1940

2,193,639

UNITED STATES PATENT OFFICE 2,193,639

STEERING WHEEL

Homer L. Mueller, Cleveland, Ohio, assignor to The Cleveland Welding Company, Cleveland, Ohio, a corporation of Ohio Application October 25, 1935, Serial No. 46,764

10 Claims. (Cl. 74—552)

This invention relates, as indicated, to wheels and more particularly to steering wheels of the type commonly used in the operation of vehicles such as automobiles.

More particularly, my invention relates to a method of and means for securing radially extending spoke members to an annular rim member.

It is, therefore, the principal object of my invention to provide a method of and means for securing radially extending spoke members to an annular rim member which result in an unusually rigid construction, a connection such that a relatively thin layer of moldable material usually employed on the rim elements of wheels such as steering wheels will fully cover such connection between the metallic spokes and rim, and which structure is such that it may be produced with greater economy than similar structures of the prior art.

My invention is particularly adapted to the production of steering wheels of the type wherein a plurality of radially extending rods are closely grouped so as to form what is termed a spoke unit. It will be understood, however, that the means herein described for the securing of said spoke to said rim is equally well adapted to those types of wheels in which a single rod comprises the spoke unit.

It is still a further object of my invention to provide an improved method for effecting the aforesaid connection between said spoke and rim elements.

Other objects of my invention will appear as the description proceeds.

To the accomplishment of the foregoing and related ends, said invention, then, consists of the means hereinafter fully described and particularly pointed out in the claims.

The annexed drawing and the following description set forth in detail certain mechanism embodying the invention, such disclosed means constituting, however, but one of various mechanical forms in which the principle of the invention may be used.

In said annexed drawing:

Fig. 1 is a plan view of a steering wheel constructed in accordance with the principles of my invention; Fig. 2 is an enlarged transverse sectional view of the structure illustrated in Fig. 1 taken on a plane substantially indicated by the line 2—2; Fig. 3 is a sectional view showing one form of my invention for securing a radially extending rod to an annular rim; Fig. 4 is an elevational view of one of the elements shown in Fig. 3; Fig. 5 is a part sectional, part elevational view of another modification of my invention; Fig. 6 is a sectional view of the assembly shown in Fig. 5 taken on a plane substantially indicated by the line 6—6; Fig. 7 is a sectional view similar to Fig. 3, showing yet another modification of my invention; Fig. 8 is a sectional view similar to Fig. 6 showing still another form of my invention; and Fig. 9 is a transverse sectional view of the element shown in Fig. 4 taken on a plane substantially indicated by the lines 9—9.

Referring now more specifically to the drawing, and more especially to Fig. 1, a steering wheel, which is one example of a wheel to which this invention is applicable, is shown as comprising radially extending spokes or rods 1 connected at their inner ends to the steering hub 2 and at their outer ends connected in accordance with the principles of my invention to an annular rim member 4. This annular rim member may be comprised either of a solid or tubular material, the latter being preferable due to its lightness in weight and its inexpensiveness.

It will be apparent that to connect such radially extending spokes or rods in any holes or apertures which might be placed through the surface of such tubular rim member would tend to weaken its structure. My invention embodies means to avoid such weakening of the structure by inserting a metallic element which acts as a connecting means between the radially extending rods or spokes and the annular rim member. These elements may be of various types or designs, two of which are shown in Figs. 4 and 5. As will be seen in Fig. 2, the connection which embodies my invention is so small as to allow any moldable material, such as rubber, which is commonly used in steering wheels of this type, to be poured around the connection, still not forming a bulky mass.

Referring more particularly to Figs. 3 and 4, which show somewhat more clearly the connection between the spokes 1 and the annular rim member, it will be seen that the rods or spokes 1 are first inserted in spaced apertures 5 in the element 3. Their ends are then headed, as shown at 6, thus forming a rivetal engagement therein to prevent said rods or spokes from sliding. The element itself is then spot welded to the inner periphery of the annular rim 4, thus forming a rather rigid connection between the radially extending spokes or rods 1 and the annular rim member 4.

It will be noted that the form of connection of said radially extending rods or spokes 1 to the element 3 may be varied somewhat. For example, the spaced apertures 5 may be threaded as well as the surface of the spokes or rods near their outer ends so that a threaded engagement may be obtained therebetween. In order to make such engagement still more rigid, it may be desirable in addition to the threading of said rods or spokes to form a head on their ends.

Fig. 7 shows another modification of Fig. 3 wherein said rods or spokes 1 are provided with collars 7, said rods or spokes being inserted in said spaced apertures 5 so that said collars 7 will be flush against the metallic element 3. The ends of said rods or spokes are then headed, thus forming a rigid connection therebetween which is modified only slightly from Fig. 3. In each of these cases the metallic element 3 is spot welded to the annular rim 4, thus providing a secure and expedient means for such connection.

Fig. 5 is a modification of Fig. 4 showing, instead of a single metallic element, a unit composed of two similar elements 8 so designed as to form a clamp about the surface of said rods or spokes 1. The surface of said rods or spokes 1 near their outer ends may be left smooth or may be serrated. In each case, however, said clamp 8 is spot welded to said radially extending rods or spokes, thus forming a still more rigid connection.

Fig. 6 shows one form of connection when the element shown in Fig. 5 is employed. When this form is used, the ends of said rods or spokes may be first headed before the rods or spokes are clamped between the elements 8 and spot welded thereto in order to insure a still more secure connection.

Fig. 8 shows a modification of Fig. 6 disclosing on the surface of said rods or spokes serrations. When the form of clamp shown in Fig. 5 is employed, a spot weld connection is formed between said clamp and said rods or spokes, and the serrations are placed on the surface of said rods or spokes in order to insure a still more rigid connection by allowing the molten metal of the elements 8 to run in between said serrations. Regardless of which type of element is used to form the connection between the rods or spokes and the annular rim, said element in each case is spot welded to the inner periphery of said annular rim.

It is desirable for the purpose of welding said elements to said annular rim 4 that each point on the outer edge of said element come in contact with the inner periphery of said annular rim 4. In order that this may be made possible, such element is designed in the form of an arc which has its center of curvature coincident with the center of curvature of said annular rim member 4.

Fig. 9 being a part elevational, part sectional view of Fig. 4, taken on a plane substantially indicated by the line 9—9, shows this desirable feature of the element 3.

Still other means of applying the principle of my invention may be employed instead of the ones explained, change being made as regards the mechanism herein disclosed, provided the means stated by any of the following claims or the equivalent of said stated means be employed.

I, therefore, particularly point out and distinctly claim as my invention:

1. In a wheel, the combination with a radially extending spoke member and an annular, tubular rim member, of means for securing said spoke to said rim comprising a metallic element with an aperture of such cross section as to snugly engage said spoke, the end of said spoke being headed to form a rivetal engagement therein, said metallic element being secured to the exterior surface of said rim by means of a spot weld.

2. In a wheel, the combination with a radially extending spoke member and an annular rim member of means for securing said spoke to said rim comprising a metallic unit composed of two separate elements each containing an aperture of such cross section as to form a clamp when placed together, snugly enclosing said spoke and being spot welded thereto, the surface of said spoke being serrated, said metallic element being spot welded to said rim.

3. In a wheel, the combination with a radially extending spoke member and an annular rim member of means for securing said spoke to said rim comprising a metallic unit composed of two separate elements in the form of an arc, the center of curvature of said unit being coincident with the center of curvature of said rim, each containing an aperture of such cross section as to form a clamp when placed together, snugly enclosing said spoke and being spot welded thereto, the end of said spoke being headed to form a rivetal engagement therein, said metallic element being spot welded to said rim.

4. In a wheel, the combination with a plurality of radially extending rods grouped to form a spoke unit, each of said rods provided with a headed end, and an annular rim member, of means for securing said spoke unit to said rim comprising a metallic unit composed of two separate elements with a plurality of apertures in each of such cross section as to form a clamp, when placed together, snugly enclosing the headed end of each rod forming a rivetal engagement therein, and being spot welded thereto, said metallic unit being spot welded to said rim.

5. In a wheel, the combination with a plurality of radially extending rods closely grouped to form a spoke unit, the ends of said rods being serrated, and an annular rim member, of means for securing said spoke unit to said rim comprising a metallic unit composed of two separate elements each containing a plurality of apertures of such cross section as to form a clamp when placed together, snugly enclosing the serrated surface of each of said rods, said metallic unit being spot welded to said rim.

6. In a wheel, the combination with a plurality of radially extending rods grouped to form a spoke unit, each of said rods provided with a headed end, and an annular rim member, of means for securing said spoke unit to said rim comprising a metallic unit composed of two separate elements having its center of curvature coincident with the center of curvature of said rim and each containing a plurality of apertures of such cross section as to form a clamp, when placed together, snugly enclosing the headed end of each rod, forming a rivetal engagement therein and being spot welded thereto, said metallic unit being spot welded to said rim.

7. In a wheel, the combination with a radially extending spoke member and an annular rim member having a transversely rounded inner periphery, of means for securing said spoke to said rim comprising a metallic element in the form of an arc with its center of curvature coincident with the center of curvature of said rim, said element having portions transversely rounded to conform to the transverse curvature of the inner periphery of said rim and having an aperture of such cross-section as to snugly engage said spoke, the end of said spoke so engaged being headed to form a rivetal engagement therein, said metallic element being secured to the exterior surface of said rim by means of atomic bond.

8. A steering wheel having a hub member, a rim member, and composite spokes, said spokes comprising a plurality of spoke members each having heads formed on one end thereof, and means formed adjacent said heads for slightly increasing the effective diameter of said spoke members, a tie-plate having apertures therethrough for receiving said spoke members, said heads being accommodated between the rim and the tie plate, said means being adapted to circumferentially engage the sides of said apertures, said tie-plate being subsequently welded to said rim member to securely anchor said spoke members thereto.

9. In an automobile steering wheel, a hub, composite spokes comprising wire spoke members extending therefrom, a rim annulus, and means connecting the outer ends of the wire spoke members of each composite spoke respectively to the annulus, said means comprising a sheet metal tie plate having its margins configured to fit snugly around a portion of the contour of the annulus at the surface of connection thereto, and having a central portion concave toward the annulus and defining therewith, when attached thereto, a cavity, the plate having apertures receiving the end portions of the wire spoke members, and head portions on the ends of said spoke members accommodated in and tightly held by the walls of the cavity.

10. In an automobile steering wheel, a hub, composite spokes comprising wire spoke members extending therefrom, a rim annulus, and means connecting the outer ends of the wire spoke members of each composite spoke respectively to the annulus, said means comprising a sheet metal tie plate having its margins configured to fit snugly around a portion of the contour of the annulus at the surface of connection thereto, and having a central portion concave toward the annulus and defining therewith, when attached thereto, a cavity, the plate having apertures receiving the end portions of the wire spoke members, and head portions of the ends of said spoke members accommodated in and tightly held by the walls of the cavity against any movement relative to the rim annulus and the plate, said spoke members having integral shoulders overlying the apertures and tightly engaging the outwardly exposed surface of the tie plate.

HOMER L. MUELLER.